US012654311B2

(12) United States Patent
Oka et al.

(10) Patent No.: US 12,654,311 B2
(45) Date of Patent: Jun. 16, 2026

(54) ROBOT HAND, HANDLING SYSTEM, ROBOT HAND CONTROL DEVICE, METHOD FOR CONTROLLING ROBOT HAND, AND STORAGE MEDIUM

(71) Applicant: KABUSHIKI KAISHA TOSHIBA, Tokyo (JP)

(72) Inventors: Yoshifumi Oka, Yokohama (JP); Kazuma Hiraguri, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 356 days.

(21) Appl. No.: 17/818,499

(22) Filed: Aug. 9, 2022

(65) Prior Publication Data
US 2023/0046345 A1     Feb. 16, 2023

(30) Foreign Application Priority Data

Aug. 13, 2021    (JP) ................................. 2021-131940

(51) Int. Cl.
*B25J 9/16* (2006.01)
*B25J 15/06* (2006.01)

(52) U.S. Cl.
CPC ......... *B25J 9/1612* (2013.01); *B25J 15/0616* (2013.01); *G05B 2219/39556* (2013.01)

(58) Field of Classification Search
CPC ................ B25J 9/1612; B25J 15/0616; G05B 2219/39322; G05B 2219/39505; G05B 2219/39529; G05B 2219/39556
See application file for complete search history.

(56) References Cited

U.S. PATENT DOCUMENTS

| | | | |
|---|---|---|---|
| 10,434,646 B2 | 10/2019 | Takeuchi | |
| 10,589,424 B2 | 3/2020 | Nammoto et al. | |

(Continued)

FOREIGN PATENT DOCUMENTS

| | | |
|---|---|---|
| CN | 107553499 A | 1/2018 |
| JP | 3-294191 A | 12/1991 |

(Continued)

OTHER PUBLICATIONS

Office Action mailed Mar. 28, 2025, in Chinese Application No. 202210966290 filed Aug. 12, 2022 (w/machine-generated English translation).

(Continued)

*Primary Examiner* — Adam R Mott
*Assistant Examiner* — Ricardo I Viscarra
(74) *Attorney, Agent, or Firm* — Oblon, McClelland, Maier & Neustadt, L.L.P.

(57) ABSTRACT

According to one embodiment, a robot hand grips an object. The robot hand includes first and second communicators, and a hand controller. The first communicator communicates grip data with a first device. The grip data is related to a gripping operation. The second communicator communicates a start notification and an end notification with a second device. The second communicator can communicate faster than the first communicator. The start notification is for starting the gripping operation. The end notification indicates an end of the gripping operation. The hand controller controls the gripping operation. In response to the start notification input to the second communicator, the hand controller starts the gripping operation. In response to the end of the gripping operation, the hand controller performs outputting the end notification, and outputting at least one of a result of the gripping operation or a state of the robot hand.

21 Claims, 14 Drawing Sheets

(56)                References Cited

U.S. PATENT DOCUMENTS

| | | | |
|---|---|---|---|
| 2014/0152096 A1 | 6/2014 | Nagatsuka | |
| 2016/0000511 A1* | 1/2016 | Hoffmann | B25J 9/1628 |
| | | | 606/130 |
| 2017/0259431 A1* | 9/2017 | Takeuchi | B25J 9/1633 |
| 2019/0160692 A1* | 5/2019 | Miyazaki | B25J 15/0009 |
| 2019/0184580 A1 | 6/2019 | Ueno | |
| 2019/0381670 A1* | 12/2019 | Correll | B25J 15/10 |
| 2020/0009738 A1 | 1/2020 | Sutherland et al. | |
| 2020/0316782 A1* | 10/2020 | Chavez | G06T 7/12 |
| 2021/0053216 A1 | 2/2021 | Diankov et al. | |
| 2021/0053230 A1 | 2/2021 | Mizoguchi et al. | |
| 2021/0114216 A1 | 4/2021 | Matsuo | |
| 2021/0394367 A1* | 12/2021 | Correll | B25J 9/1664 |

FOREIGN PATENT DOCUMENTS

| | | |
|---|---|---|
| JP | 2006-000955 | 1/2006 |
| JP | 2006-171960 A | 6/2006 |
| JP | 2010-94787 A | 4/2010 |
| JP | 2012-101315 A | 5/2012 |
| JP | 2013-33347 A | 2/2013 |
| JP | 2019-18280 A | 2/2019 |
| JP | 2019-104099 A | 6/2019 |
| JP | 6578671 B2 | 9/2019 |
| JP | WO 2019/176386 A1 | 9/2019 |
| JP | 6696341 B2 | 5/2020 |
| JP | 6793428 B1 | 12/2020 |
| JP | 2021-84210 A | 6/2021 |
| JP | 2021-86232 A | 6/2021 |

OTHER PUBLICATIONS

Combined Chinese Office Action and Search Report issued Nov. 6, 2025 in Chinese Patent Application No. 202210966290.X (with unedited computer-generated English translation), 6 pages.

* cited by examiner

ROBOT HAND, HANDLING SYSTEM, ROBOT HAND CONTROL DEVICE, METHOD FOR CONTROLLING ROBOT HAND, AND STORAGE MEDIUM

CROSS-REFERENCE TO RELATED APPLICATIONS

This application is based upon and claims the benefit of priority from Japanese Patent Application No. 2021-131940, filed on Aug. 13, 2021; the entire contents of which are incorporated herein by reference.

FIELD

Embodiments described herein relate generally to a robot hand, a robot handling system, a robot hand control device, a method for controlling the robot hand, and a storage medium.

BACKGROUND

There is a robot hand that grips an object. It is desirable for the robot hand to be capable of faster communication with other devices.

DETAILED DESCRIPTION

Figure 1:
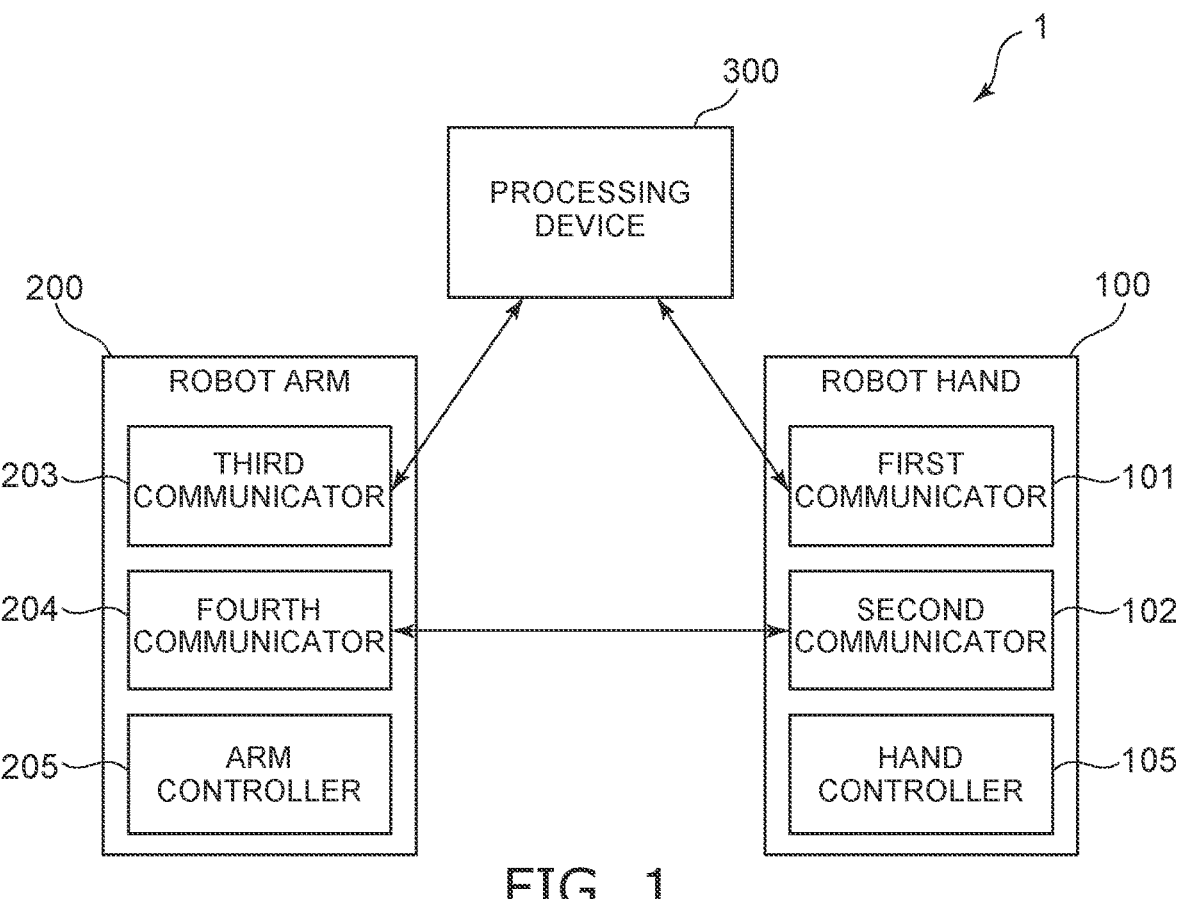
FIG. 1 is a schematic view showing functions of a handling system according to an embodiment.

According to one embodiment, a robot hand grips an object. The robot hand includes a first communicator, a second communicator, and a hand controller. The first communicator communicates grip data with a first device. The grip data is related to a gripping operation. The second communicator communicates a start notification and an end notification with a second device. The second communicator is capable of communicating faster than the first communicator. The start notification is for starting the gripping operation. The end notification indicates an end of the gripping operation. The hand controller controls the gripping operation. In response to the start notification input to the second communicator, the hand controller starts the gripping operation based on the grip data input to the first communicator. In response to the end of the gripping operation, the hand controller performs an output of the end notification from the second communicator to the second device, and an output from the first communicator to the first device of at least one of a result of the gripping operation or a state of the robot hand.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously or illustrated in an antecedent drawing are marked with like reference numerals, and a detailed description is omitted as appropriate.

FIG. 1 is a schematic view showing functions of a handling system according to an embodiment.

As shown in FIG. 1, the handling system 1 according to the embodiment includes a robot hand 100, a robot arm 200, and a processing device 300. The handling system 1 handles an object. Handling includes gripping an object, transferring the object, and releasing the gripped object.

The robot hand 100 grips an object. The robot hand 100 includes a first communicator 101, a second communicator 102, and a hand controller 105. The hand controller 105 controls operations of the robot hand 100. The first communicator 101 communicates with the processing device 300.

The robot arm 200 moves the robot hand 100. The robot arm 200 includes a third communicator 203, a fourth communicator 204, and an arm controller 205. The arm controller 205 controls operations of the robot arm 200. The third communicator 203 communicates with the processing device 300. The fourth communicator 204 communicates with the second communicator 102.

The processing device 300 generates grip data related to the gripping operation of the robot hand 100, generates control data of the robot arm 200, etc. The grip data, the result of the gripping operation, and the state of the robot hand 100 are communicated between the first communicator 101 and the processing device 300. The control data of the robot arm 200 is communicated between the third communicator 203 and the processing device 300. Signals related to the gripping operation and signals related to the control of the robot arm 200 are communicated between the second communicator 102 and the fourth communicator 204. The second communicator 102 is capable of communicating faster than the first communicator 101. The fourth communicator 204 is capable of communicating faster than the third communicator 203. For example, the data amount that is communicated between the second communicator 102 and the fourth communicator 204 is less than the data amount communicated between the first communicator 101 and the processing device 300 and the data amount communicated between the third communicator 203 and the processing device 300.

For example, the first communicator 101 and the third communicator 203 communicate with the processing device 300 via at least one selected from serial communication (RS-232C, RS-422, or RS-485), Serial Peripheral Interface (SPI), Inter-Integrated Circuit (I2C), Universal Serial Bus (USB), Ethernet, and Bluetooth (registered trademark). The first communicator 101 and the third communicator 203 are communication interfaces (I/Fs) corresponding to one of the communication techniques. Relatively large amounts of data such as grip data and the like can be stably communicated using such techniques.

The second communicator 102 and the fourth communicator 204 communicate with each other via at least one selected from digital input/output (I/O) and parallel communication. Bus connections, Advanced Technology Attachment (ATA), and Peripheral Component Interconnect (PCI) are examples of parallel communication. The second communicator 102 and the fourth communicator 204 are communication I/Fs corresponding to one of the communication techniques. The second communicator 102 and the fourth communicator 204 can communicate faster than the first and third communicators 101 and 203 by using such a technique.

The hand controller 105 and the arm controller 205 each include a control device that includes an arithmetic processor and a memory region. The hand controller 105 and the arm controller 205 operate according to programs stored in their respective memory regions. The first communicator 101 and the second communicator 102 may be located separately from the hand controller 105 and may be connected with the hand controller 105. Or, the first communicator 101 and the second communicator 102 may be embedded in a control device that functions as the hand controller 105. The third communicator 203 and the fourth communicator 204 may be located separately from the arm controller 205 and may be connected with the arm controller 205. Or, the third communicator 203 and the fourth communicator 204 may be embedded in a control device that functions as the arm controller 205.

Figure 2:
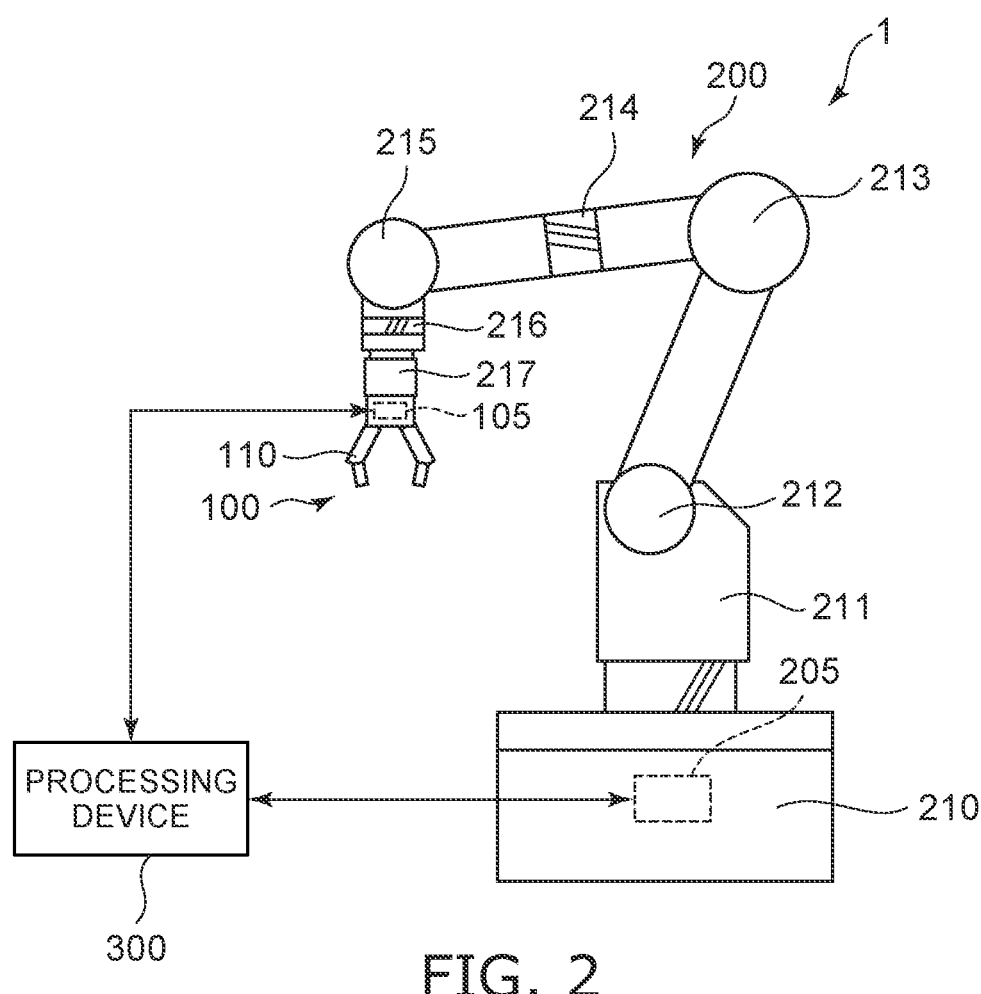
FIG. 2 is a schematic view showing the configuration of a handling system according to the embodiment.

FIG. 2 is a schematic view showing the configuration of a handling system according to the embodiment.

For example, as shown in FIG. 2, the robot arm 200 is a vertical articulated robot that includes the six axes of first to sixth axes 211 to 216. The robot arm 200 is fixed to a housing 210. The arm controller 205 operates the first to sixth axes 211 to 216 to move the distal part of the robot arm 200 and adjust the orientation of the distal part of the robot arm 200.

The housing 210 houses various components and devices of the handling system 1 such as power supply devices for driving electric actuators such as motors, cylinders, tanks, and compressors for driving fluid actuators, various safety mechanisms, etc. The processing device 300 may be housed inside the housing 210.

The robot hand 100 is mounted to the distal part of the robot arm 200 via a force sensor 217. The force sensor 217 detects the force applied to the robot arm 200 in the direction from the robot hand 100 toward the distal part of the robot arm 200. In other words, the force sensor 217 detects the pressing force from the robot arm 200 (the robot hand 100) toward the object.

The "distal part" of the robot arm 200 refers to the part of the robot arm 200 that has not less than six degrees of freedom due to the first to sixth axes 211 to 216. Hereinafter, "orientation" refers to the orientation of the distal part of the robot arm 200 (in other words, the orientation of the robot hand 100).

The robot arm 200 is not limited to the example shown in FIG. 2 and may be a horizontal articulated robot, a linear robot, an orthogonal robot, or a parallel link robot instead of a vertical articulated robot. The robot arm 200 may include a combination of at least two selected from a vertical articulated robot, a horizontal articulated robot, a linear robot, an orthogonal robot, and a parallel link robot.

In the example of FIG. 2, the robot hand 100 grips an object by pinching by using a pinching mechanism 110. The pinching mechanism 110 includes not less than two fingers. Other than pinching, the robot hand 100 may grip the object by suction-gripping or jamming. Herein, a control method in the case where the robot hand 100 pinches the object will be described in detail.

Figure 3:
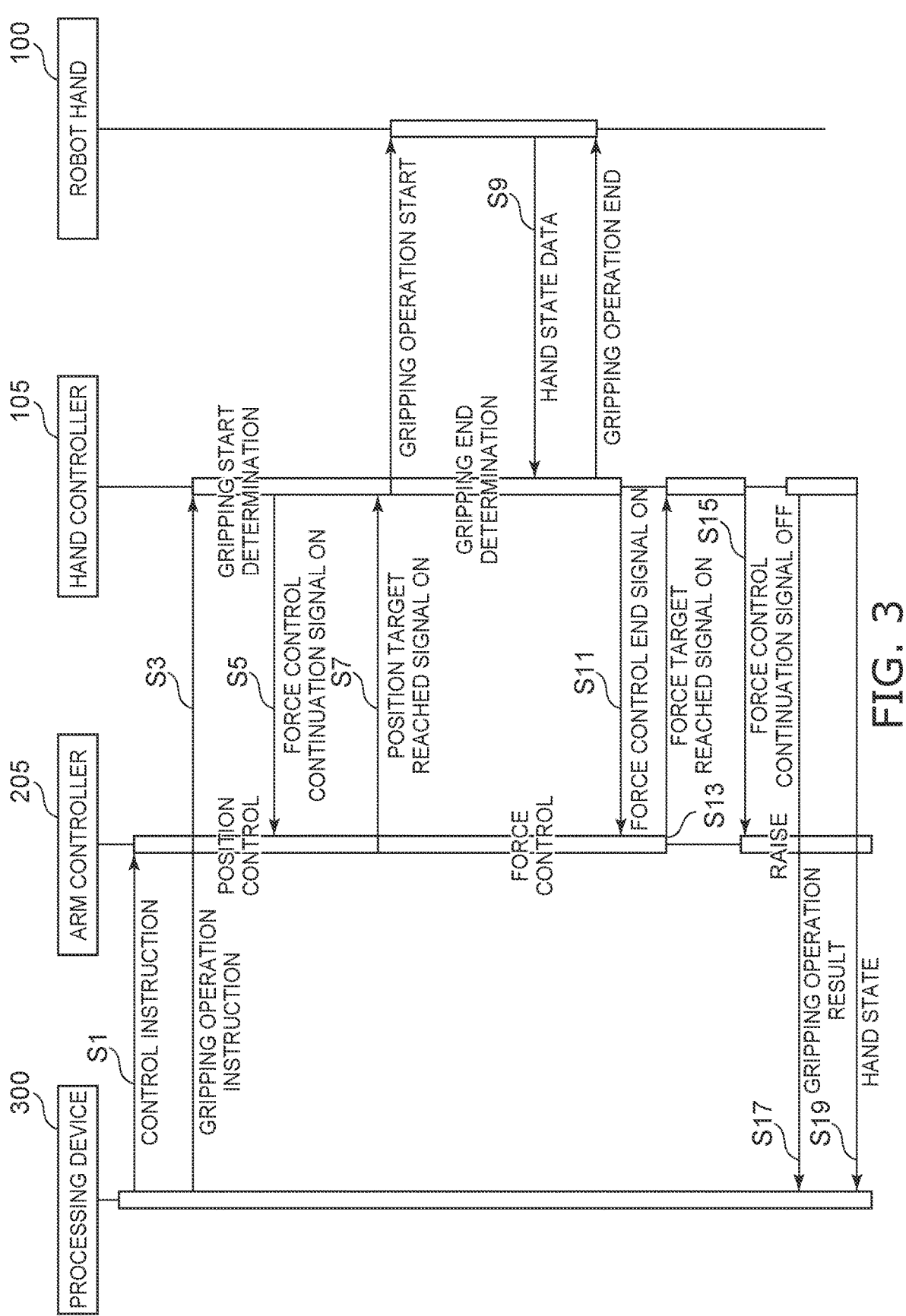
FIG. 3 is a control sequence diagram of the handling system according to the embodiment.

FIG. 3 is a control sequence diagram of the handling system according to the embodiment.

First, the processing device 300 outputs (transmits) a control instruction S1 to the arm controller 205. The control instruction S1 includes position control data related to the position control of the robot arm 200 and force control data related to the force control of the robot arm 200. The target position of the robot arm 200, the movement path of the robot arm 200 to the target position, the grip orientation at the target position, etc., are output as the position control data. The target force in the gripping operation, etc., are output as the force control data. The arm controller 205 performs the position control based on the position control data according to the input (the reception) of the control instruction S1. In the position control, the movement of the robot arm 200 distal part along the movement path to the target position and the setting of the orientation are performed.

After outputting the control instruction S1, the processing device 300 outputs a gripping operation instruction S3 to the hand controller 105. The gripping operation instruction S3 includes grip data related to the gripping operation. The grip data includes the grip width and the grip force when gripping (pinching) the object. The grip width is the spacing between the fingers of the pinching mechanism 110 when gripping the object, and corresponds to the length of the object in any one direction. The grip force refers to the magnitude of the force when the object is pinched by the pinching mechanism 110.

When the gripping operation instruction S3 is input, the hand controller 105 performs a gripping start determination. The hand controller 105 starts the gripping operation when a signal that triggers the gripping start is input in the gripping start determination. Also, in the gripping start determination, the hand controller 105 outputs a force control continuation signal ON S5 to the arm controller 205. The force control continuation signal ON S5 indicates that the force control may be performed.

When the position control has ended, the arm controller 205 outputs target position reached signal ON S7 to the hand controller 105. The target position reached signal ON S7 indicates that the robot arm 200 has reached the target position and the orientation of the robot arm 200 is set to the grip orientation. The hand controller 105 starts the gripping operation of the robot hand 100 when the target position reached signal ON S7 is input in the gripping start determination. In other words, the target position reached signal ON S7 is a signal that triggers the start of the gripping operation. Also, the hand controller 105 performs a gripping end determination after starting the gripping operation.

The arm controller 205 starts the force control based on the condition of the input of the force control continuation signal ON S5 and the output of the target position reached signal ON S7. The arm controller 205 moves the distal part of the robot arm 200 toward the object until the force detected by the force sensor 217 reaches a preset value. Thereby, the robot hand 100 is pressed toward the object.

The hand controller 105 acquires hand state data S9 of the robot hand 100 in the gripping operation. For example, the hand state data S9 includes the current value and rotation amount of the motor, etc., and indicates the grip width and the grip force.

In the gripping end determination, the hand controller 105 determines whether or not the grip width and the grip force of the hand state data S9 have reached the values instructed by the gripping operation instruction S3. When the instructed grip width and grip force are realized, the hand controller 105 ends the gripping operation of the robot hand 100. For example, the robot hand 100 grips the object when the gripping operation ends.

When the gripping operation has ended, the hand controller 105 outputs a force control end signal ON S11 to the arm controller 205. The force control end signal ON S11 indicates that the gripping operation has ended.

The arm controller 205 ends the force control when the force control end signal ON S11 is input after the force control continuation signal ON S5 is input. When the force control end signal ON S11 is received or the detected value of the force sensor 217 has reached the target force, the arm controller 205 outputs a target force reached signal ON S13 to the hand controller 105. The target force reached signal ON S13 indicates that the detected value of the force sensor 217 has reached the value of the target force in the force control, or that the force control has ended.

When the target force reached signal ON S13 is input, the hand controller 105 outputs a force control continuation signal OFF S15 to the arm controller 205. When the force control continuation signal OFF S15 is input after the force control continuation signal ON S5 is input, the arm controller 205 operates the robot arm 200 to lift up the robot hand 100 and the object. For example, after lifting up, the robot arm 200 transfers the gripped object to a designated location.

After outputting the force control continuation signal OFF S15, the hand controller 105 outputs a gripping operation result S17 and a hand state S19 to the processing device 300. The gripping operation result S17 indicates the success or failure of the gripping in the gripping operation by the robot hand 100. The hand state S19 includes the gripping operation result, the position, speed, and current value of the motor driving the robot hand 100, etc. If the gripping operation fails, the hand state S19 may further include an error status that indicates the cause of the failure.

Figure 4:
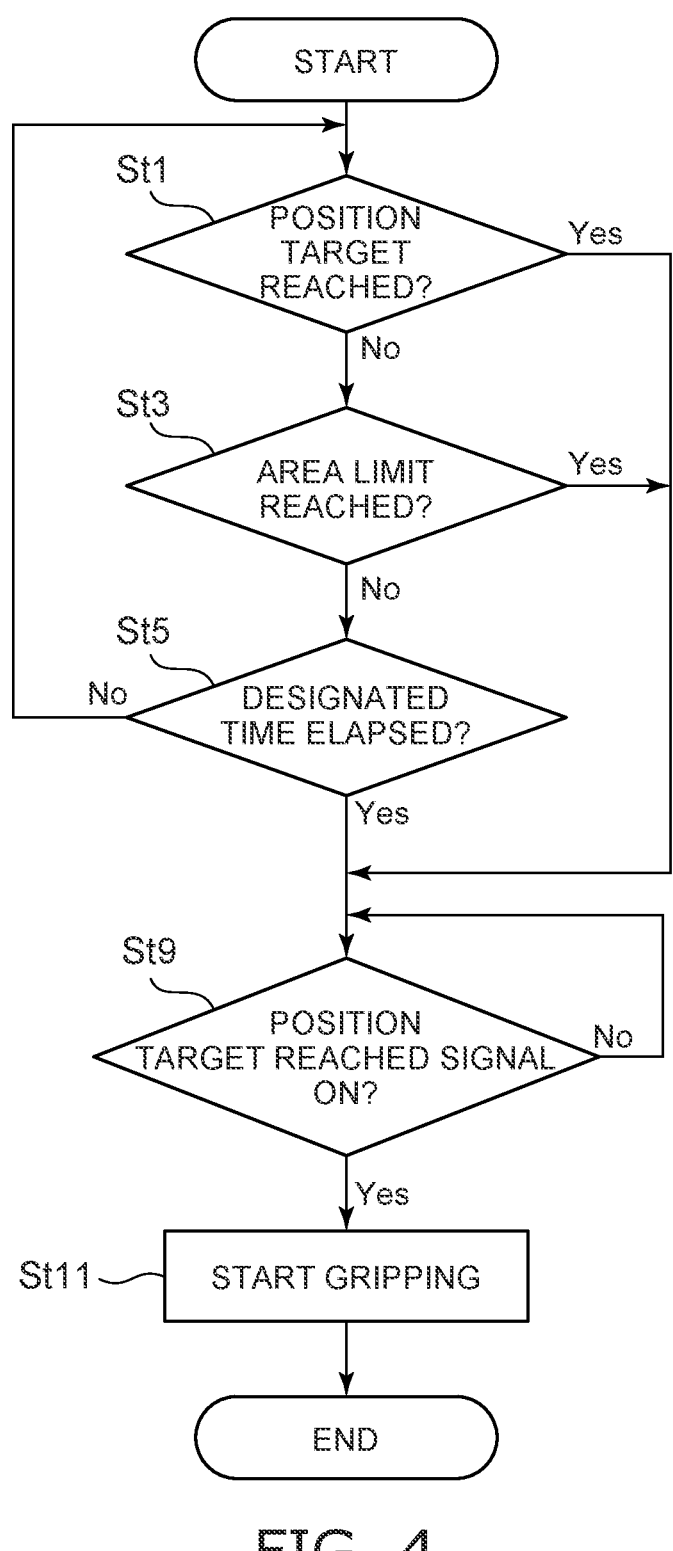
FIG. 4 is a flowchart showing processing related to the gripping start determination of the handling system according to the embodiment.

FIG. 4 is a flowchart showing processing related to the gripping start determination of the handling system according to the embodiment.

The arm controller 205 determines whether or not the target position has been reached in the position control (step St1). When the target position has not been reached, the arm controller 205 determines whether or not the robot arm 200 has reached the area limit (step St3). The area limit is the limit of the operation region of the robot arm 200. When the area limit has not been reached, the hand controller 105 determines whether or not a predesignated amount of time has elapsed from the start of the position control (step St5). The amount of time is preset by the user as a time limit within which the position control can be performed. Step St1 is re-performed when the designated time has not elapsed.

When performing steps St1, St3, and St5, the determination results are communicated as appropriate between the robot hand 100 and the robot arm 200 via the second and fourth communicators 102 and 204.

When it is determined that the target position has been reached, the area limit has been reached, or the designated time has elapsed, the hand controller 105 determines whether or not the target position reached signal ON S7 has been received (step St9). More specifically, the arm controller 205 generates the target position reached signal ON S7 when the arm controller 205 determines that the target position has been reached or the area limit has been reached. The arm controller 205 transmits the target position reached signal ON S7 to the hand controller 105, ends the position control, and transitions to the force control. When receiving the target position reached signal ON S7, the hand controller 105 causes the robot hand 100 to start the gripping operation (step St11). When the hand controller 105 determines that the predesignated amount of time has elapsed, the hand controller 105 generates position control end signal ON and transmits the position control end signal ON to the arm controller 205. When receiving the position control end signal ON, the arm controller 205 transmits the target position reached signal ON S7 to the hand controller 105, ends the position control, and transitions to the force control. When receiving the target position reached signal ON S7, the hand controller 105 starts the gripping operation (step St11). Or, when it is determined that the predesignated amount of time has elapsed, the hand controller 105 may generate the position control end signal ON and start the gripping operation before receiving the target position reached signal ON S7. When the communication is normal between the hand controller 105 and the arm controller 205, the hand controller 105 receives the target position reached signal ON S7 according to the generation and transmission of the position control end signal ON. This is because the generation of the position control end signal ON can be considered to be the reception of the target position reached signal ON S7.

Figure 5:
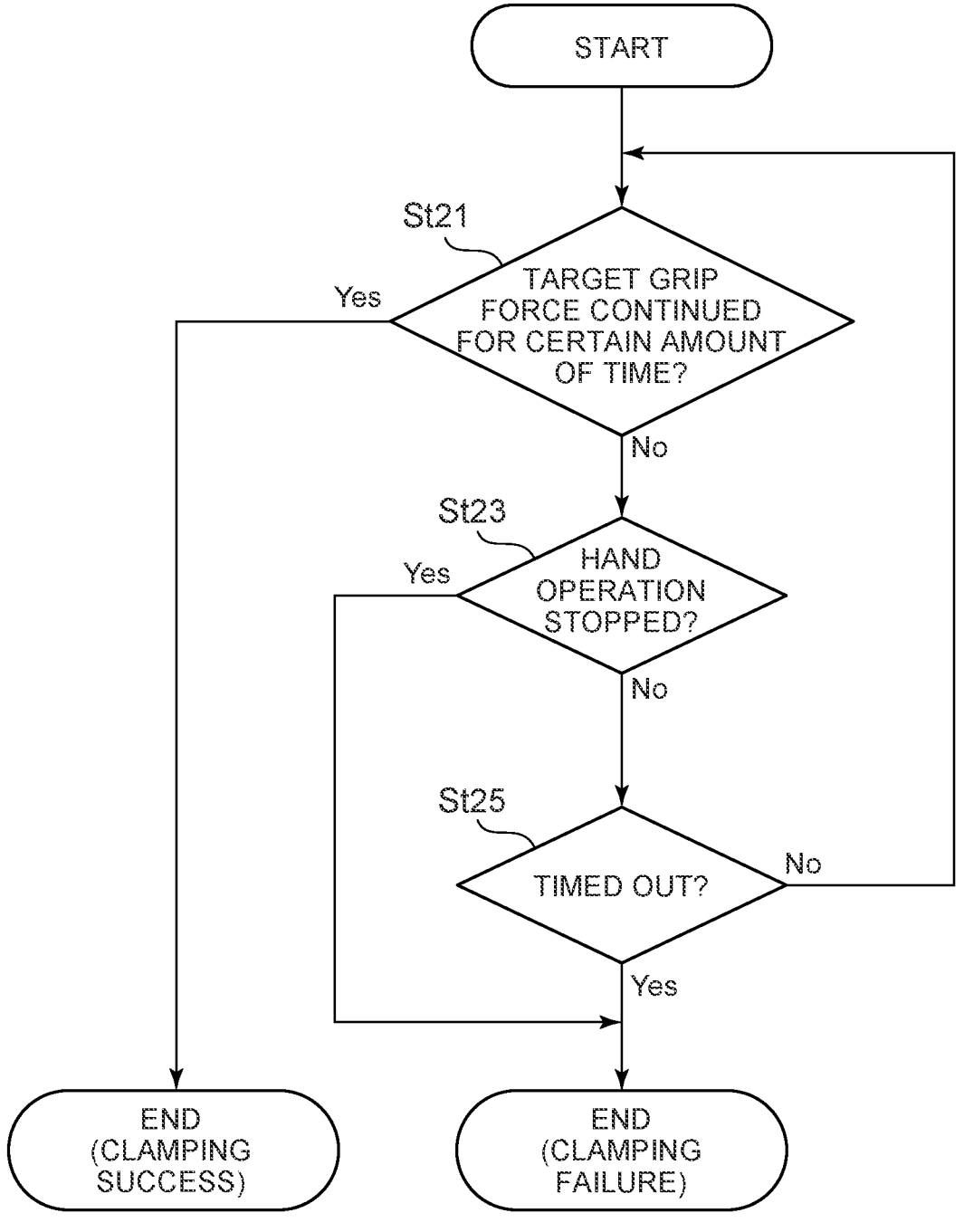
FIG. 5 is a flowchart showing the gripping end determination of the handling system according to the embodiment.

FIG. 5 is a flowchart showing the gripping end determination of the handling system according to the embodiment.

When the gripping operation is started, the hand controller 105 calculates the grip force based on the hand state data S9. For example, the robot hand 100 includes fingers that pinch the object. The joints of the fingers are driven by motors. The hand controller 105 calculates the grip force from the current values of the motors. The hand controller 105 compares the calculated grip force to the target grip force instructed from the processing device 300. The hand controller 105 determines whether or not the target grip force is continued for a certain amount of time (step St21).

When the target grip force is not continued for a certain amount of time, the hand controller 105 determines whether or not the motion of the robot hand 100 is stopped (step St23). The motion stop is determined based on the rotation amount of the motor. For example, the motion of the robot hand 100 is determined to be stopped when the rotational speed of the motor drops below a preset threshold. When the motion of the robot hand 100 has not stopped, the hand controller 105 determines whether or not a timeout has occurred (step St25). In other words, it is determined whether or not a preset amount of time has elapsed from the start of the gripping operation. Step St21 is re-performed when a timeout has not occurred.

When the target grip force has continued for a certain amount of time, the hand controller 105 determines that the pinching is successful, and ends the gripping operation.

When the motion of the robot hand 100 has stopped or timeout has occurred, the hand controller 105 determines that the pinching has failed, and ends the gripping operation. The result of the success or the failure is output from the hand controller 105 to the processing device 300.

Figure 6:
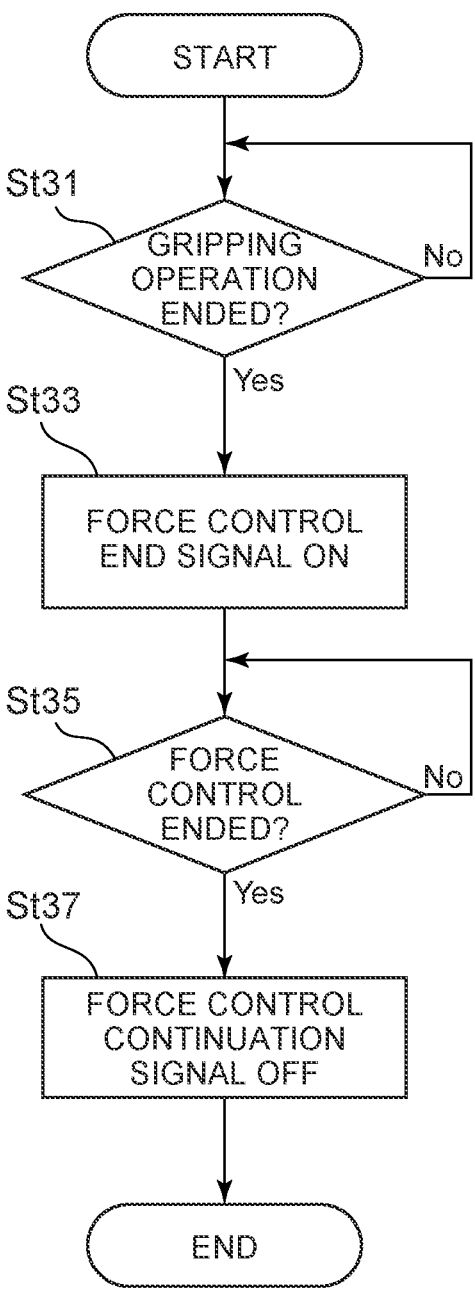
FIG. 6 is a flowchart showing a control in the gripping operation end of the handling system according to the embodiment.

FIG. 6 is a flowchart showing a control in the gripping operation end of the handling system according to the embodiment.

The hand controller 105 determines whether or not the gripping operation has ended (step St31). When the gripping operation has ended, the hand controller 105 outputs the force control end signal ON S11 to the arm controller 205 (step St33). The hand controller 105 determines whether or not the force control has ended (step St35). In other words, the hand controller 105 determines whether or not the target force reached signal ON S13 is input from the arm controller 205. When the force control has ended, the hand controller 105 outputs the force control continuation signal OFF S15 to the arm controller 205 (step St37). The robot hand 100 and the object are lifted up by the robot arm 200.

Other than the various signals described above, a stop signal that instructs the operation stop may be communicated between the fourth communicator 204 and the second communicator 102. The robot arm 200 determines that an excessive force is applied to the robot hand 100 or the robot arm 200 when the detected value of the force sensor 217 is greater than a threshold. The arm controller 205 stops the operation of the robot arm 200. The stop signal is communicated from the arm controller 205 to the hand controller 105 via the fourth and second communicators 204 and 102. When receiving the stop signal, the hand controller 105 stops the operation of the robot hand 100. For example, the operations of the robot hand 100 and the robot arm 200 are immediately stopped when the robot hand 100 or the robot arm 200 collides with something.

Or, the hand controller 105 determines that an excessive current is flowing in a motor when the current value of the motor is greater than a threshold. The hand controller 105 stops the operation of the robot hand 100. Also, the stop signal is communicated from the hand controller 105 to the arm controller 205 via the second and fourth communicators 102 and 204. When receiving the stop signal, the arm controller 205 stops the operation of the robot arm 200. For example, the operations of the robot hand 100 and the robot arm 200 are immediately stopped when an abnormality occurs in the robot hand 100. According to such controls, the safety of the robot hand 100 and the robot arm 200 can be improved.

Advantages of the embodiment will now be described.

To grip diverse objects, it is favorable to calculate grip data such as the grip force and grip width in the gripping operation, etc., and to perform the gripping based on the grip data. To calculate the grip data, it is favorable for the processing device 300 to be provided separately from the robot hand 100 and the robot arm 200. By providing the processing device 300, the robot hand 100 and the robot arm 200 can be downsized compared to when the function of the processing device 300 is embedded in the robot hand 100 or the robot arm 200. When the robot hand 100 and the robot arm 200 are used as modules, the robot hand 100 and the robot arm 200 can be combined with more types of other robot arms 200 and other robot hands 100. In other words, the modularity of the robot hand 100 and the robot arm 200 can be improved.

The gripping operation requires collaboration between the robot hand 100 and the robot arm 200. For example, the gripping operation of the robot hand 100 is started after the robot arm 200 reaches the target position. The robot arm 200 is lifted up after the gripping operation of the robot hand 100. For the collaboration between the robot hand 100 and the robot arm 200, it is favorable to communicate the signals related to the gripping operation and the signals related to the control of the robot arm 200 between the robot hand 100 and the robot arm 200.

Figure 7A:
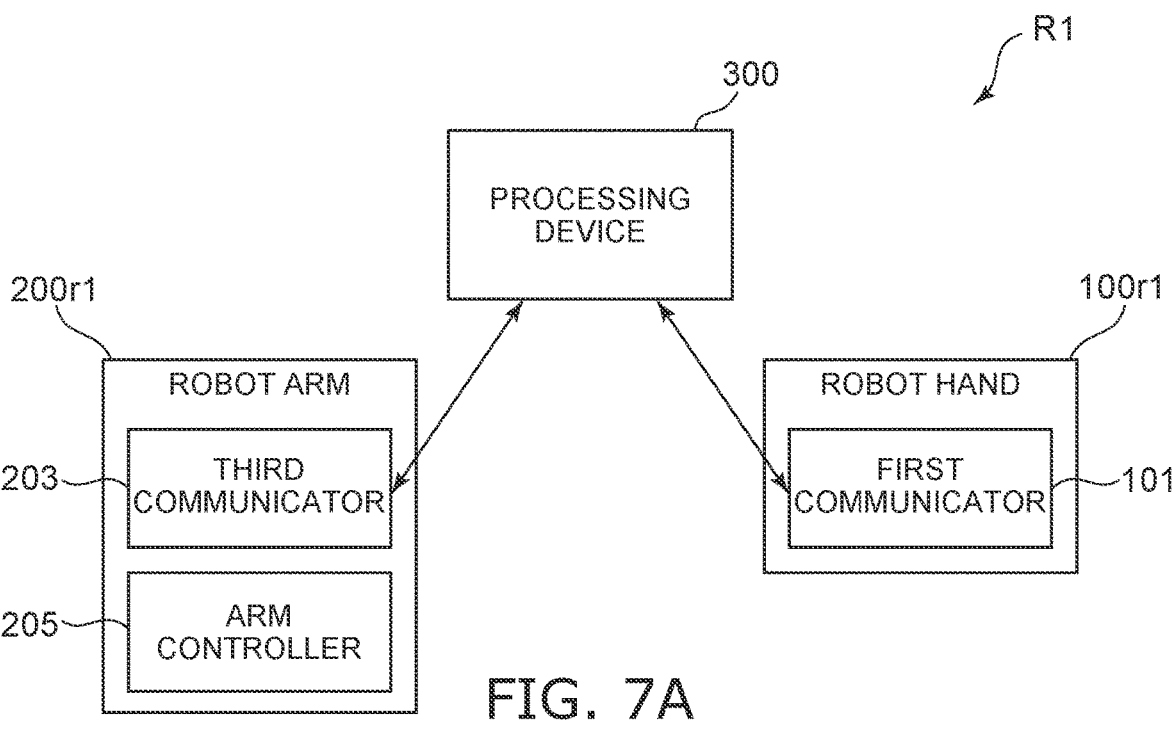
FIGS. 7A and 7B are schematic views showing functions of handling systems according to reference examples.
Figure 7B:
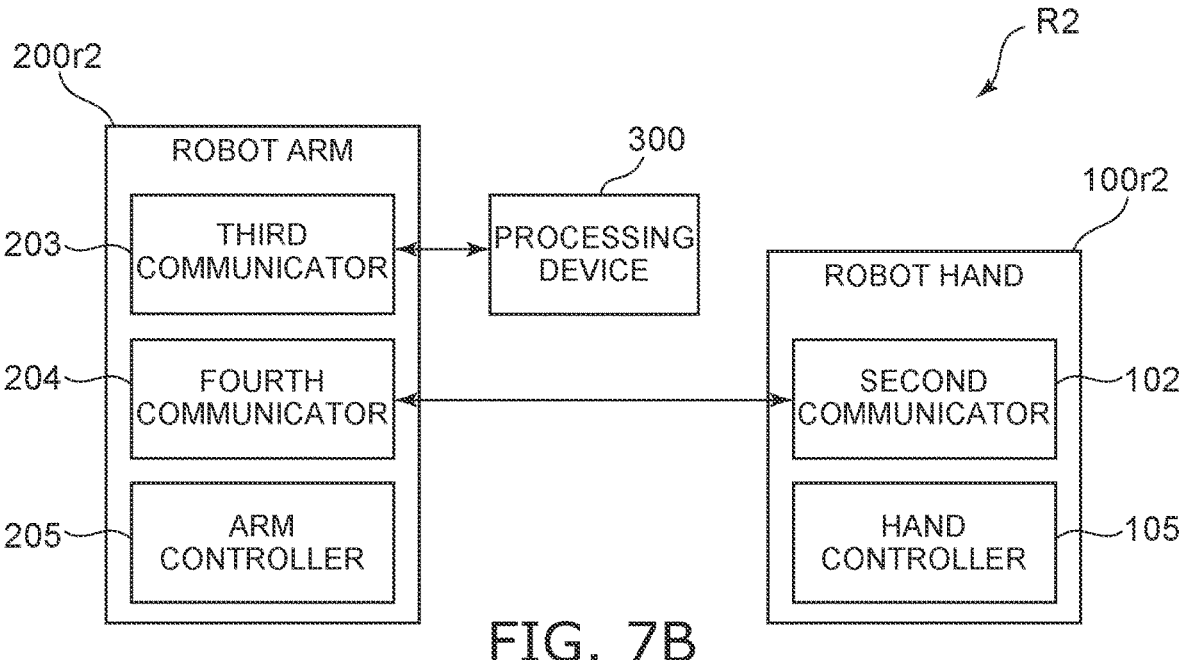

FIGS. 7A and 7B are schematic views showing functions of handling systems according to reference examples.

For example, in a handling system R1 shown in FIG. 7A, a robot hand 100r1 includes neither the second communicator 102 nor the hand controller 105. A robot arm 200r1 does not include the fourth communicator 204. In the handling system R1, the processing device 300 performs the control of the robot hand 100r1. According to the handling system R1, the modularity of the robot hand 100r1 can be increased.

In a handling system R2 shown in FIG. 7B, a robot hand 100r2 does not include the first communicator 101. In the handling system R2, a robot arm 200r2 communicates with the robot hand 100r2 for instructions such as grip data and the like in addition to signals related to the start and end of the gripping operation. According to the handling system R2, the communication between the robot hand 100r2 and the robot arm 200r2 can be faster, and the operation of the handling system R2 can be performed more quickly.

On the other hand, in the handling system R1 shown in FIG. 7A, delays occur in the communication between the robot hand 100r1 and the processing device 300 and the communication between the robot arm 200r1 and the processing device 300 when the calculation amount of the processing device 300 is increased to improve the accuracy and efficiency of the gripping operation. As a result, the time necessary for the handling by the robot hand 100r1 and the robot arm 200r1 is longer.

In the handling system R2 shown in FIG. 7B, a unique controller that corresponds to the robot hand 100r2 connected to the arm controller 205 of the robot arm 200r2 is embedded. Therefore, the robot hand 100r2 cannot be replaced with another type of robot hand 100r2. Also, when replacing the robot arm 200r2, the robot hand 100r2 also must be replaced with a robot hand 100r2 that corresponds to the robot arm 200r2 after the replacement. In the handling system R2, the modularity of the robot hand 100r2 and the robot arm 200r2 is lost.

For these problems, according to the robot hand 100 according to the embodiment, the first communicator 101 communicates the grip data related to the gripping operation with the processing device 300 (a first device). The second communicator 102 communicates the start notification and the end notification with the robot arm 200 (a second device). The start notification is a notification for starting the gripping operation, and in the example shown in FIG. 3, corresponds to the target position reached signal ON S7. The end notification is a notification indicating the end of the gripping operation, and in the example shown in FIG. 3, corresponds to the force control end signal ON S11.

In response to the start notification input to the second communicator 102, the hand controller 105 starts the gripping operation based on the grip data input to the first communicator 101. When the gripping operation has ended, the hand controller 105 outputs the end notification from the second communicator 102 to the robot arm 200. Also, the hand controller 105 outputs the gripping operation result S17 or the hand state S19 from the first communicator 101 to the processing device 300.

According to the robot arm 200 according to the embodiment, the second communicator 102 communicates the start notification and the end notification related to the start and end of the gripping operation with the robot arm 200. Thereby, the operations related to the handling can be performed more quickly than the case of communication between the robot hand 100 and the robot arm 200 via the processing device 300 as in the handling system R1. As a result, the handling of the object can be completed in less time, and the efficiency of the handling can be increased.

According to the robot arm 200 according to the embodiment, the first communicator 101 communicates the grip data, the gripping operation result, the hand state, etc., with the processing device 300. Thereby, it is unnecessary to embed a controller for the robot hand 100 in the arm controller 205 as in the handling system R2. Therefore, the degradation of the modularity of the robot arm 200 can be suppressed.

According to the embodiment, fast communication between the robot hand 100 and the robot arm 200 is possible while improving the modularity of the robot arm 200.

Other than the start notification and the end notification, the second communicator 102 communicates with the robot arm 200 a notification (the target force reached signal ON S13) indicating that the pressing force of the robot arm 200 has reached the target force, a notification (the force control continuation signal OFF S15) to start to lift up the robot arm 200, etc. According to the embodiment, these notifications also can be quickly communicated, and the efficiency of the handling can be further increased.

Similarly to the robot hand 100, the robot arm 200 includes the third communicator 203 and the fourth communicator 204. The control instruction S1 is communicated between the third communicator 203 and the processing device 300. The start notification and the end notification are communicated between the fourth communicator 204 and the robot hand 100 (a third device). Accompanying the end notification, the target force reached signal ON S13 and the force control continuation signal OFF S15 are communicated between the fourth communicator 204 and the robot hand 100. By providing the third communicator 203 and the fourth communicator 204, the communication with the robot hand 100 can be faster while suppressing the degradation of the modularity of the robot arm 200.

The force control of the robot arm 200 is performed in conjunction with the gripping operation of the robot hand 100; therefore, the robot hand 100 that does not include highly functional sensors can perform complex tasks according to the load and/or contact conditions at the fingers.

For example, the robot hand 100 can perform an operation of gripping an object by being positioned obliquely to the object and scooping the object. The robot hand 100 may pinch the object while scooping the object. In these operations, a "following operation" is necessary in which the robot hand 100 moves along the floor surface in contact with the floor surface. The following operation can be more stably performed by controlling the robot arm 200 based on the detected value of the force sensor 217 when contacting the floor surface.

Or, an operation of gripping an object can be performed in which objects closely contact each other, and a finger of the pinching mechanism 110 is inserted into a gap between the objects. In such an operation, an "insertion operation" is necessary in which the positions of the fingers are adjusted. The insertion operation can be more stably performed by controlling the robot hand 100 and the robot arm 200 according to the reaction forces on the fingers detected by the force sensor 217.

Modification

Figure 8:
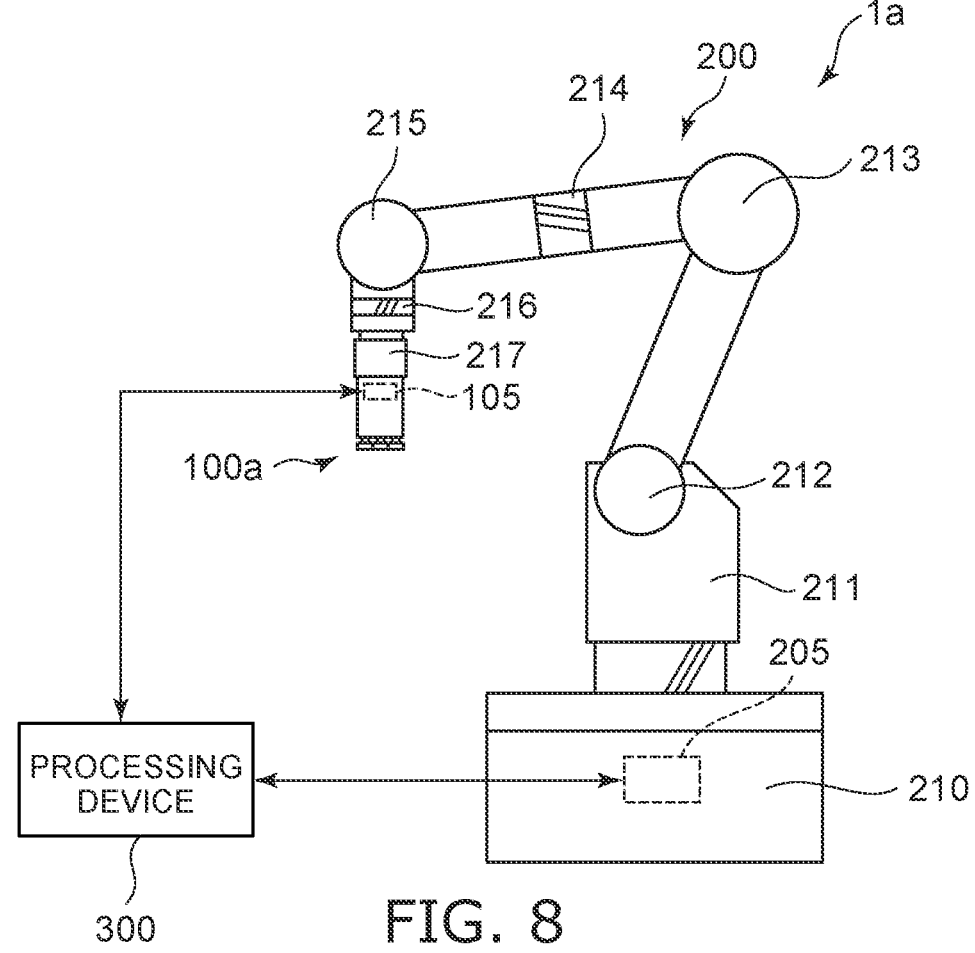
FIG. 8 is a schematic view showing a configuration of a handling system according to a modification of the embodiment.

FIG. 8 is a schematic view showing a configuration of a handling system according to a modification of the embodiment.

The handling system 1a according to the modification includes a robot hand 100a. The robot hand 100a includes a suction mechanism instead of the pinching mechanism 110. An object can be suction-gripped by operating the suction mechanism while the robot hand 100 is in contact with the object.

Figure 9:
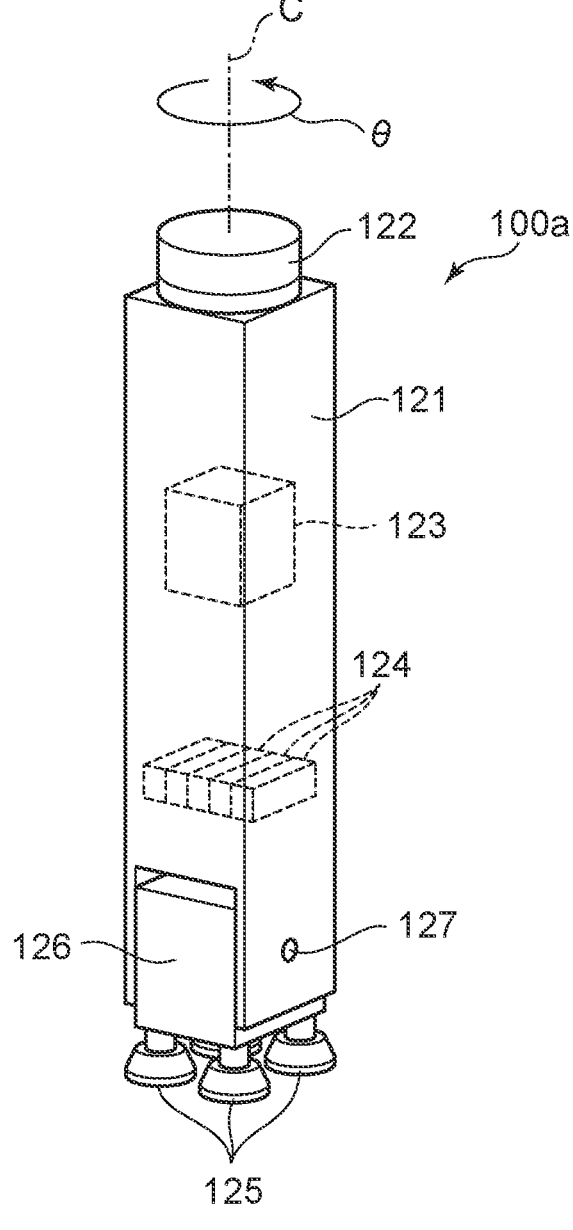
FIG. 9 is a schematic view showing the robot hand according to the modification of the embodiment.

FIG. 9 is a schematic view showing the robot hand according to the modification of the embodiment.

As shown in FIG. 9, the robot hand 100a includes a base 121, a rotatable part 122, a suction device 123, multiple switch valves 124, multiple suction pads 125, a base distal part 126, and a rotatable part 127.

For example, the base 121 has a rectangular parallelepiped exterior shape and forms the contour of the robot hand 100a. The base 121 is linked to the robot arm 200 via the rotatable part 122. The base 121 may be box-shaped or may include only a frame.

The rotatable part 122 rotatably links the base 121 to the robot arm 200. A rotation central axis C of the rotatable part 122 is substantially parallel to the direction in which the base 121 and the distal part of the robot arm 200 are arranged. The rotatable part 122 can rotate the base 121 of the robot hand 100a with respect to the robot arm 200 in a 0 direction and in the opposite direction. The rotatable part 122 may be included as a part of the robot arm 200 rather than as a part of the robot hand 100a.

The suction device 123 is located inside the base 121. The suction device 123 is, for example, a vacuum pump. The suction device 123 communicates with each of the multiple suction pads 125 via hoses, etc. The pressure inside each suction pad 125 is caused to be less than atmospheric pressure by driving the suction device 123; and the object is suction-gripped by the suction pads 125. The pressures inside the suction pads 125 are detected by not-illustrated negative pressure sensors.

The multiple switch valves 124 are provided respectively for the multiple suction pads 125. Each switch valve 124 is set to a first state or a second state. In the first state, the corresponding suction pad 125 communicates with the suction device 123. In the second state, the communication between the suction pad 125 and the suction device 123 is blocked, and the suction pad 125 communicates with the outside of the robot hand 100a (atmospheric pressure space). For example, the number of the switch valves 124 set to the first state is adjusted according to the size of the object to be gripped.

The base distal part 126 is linked to one end part of the base 121 via the rotatable part 127. The multiple suction pads 125 are arranged with each other at one end part of the base distal part 126. The rotatable part 127 is located between the base distal part 126 and the base 121 and rotatably links the base distal part 126 to the base 121.

The object can be suction-gripped by operating the suction mechanism that includes the suction device 123, the multiple switch valves 124, and the multiple suction pads 125.

In the handling system 1a according to the modification, similarly to the handling system 1, the control shown in the control sequence diagram of FIG. 3 is performed. In the handling system 1a, the grip data that is output by the gripping operation instruction S3 includes the suction pads 125 to be used when gripping and the pressure when suction-gripping. The hand state data S9 includes the pressure of each suction pad 125 detected by the negative pressure sensors.

When the object is gripped by suction, the suctioning by the suction pad 125 may be started in the position control of the robot arm 200. In other words, the hand controller 105 may start the gripping operation after the gripping operation instruction S3 is input and before the target position reached signal ON S7 is input. The object can be more quickly gripped thereby.

Figure 10:
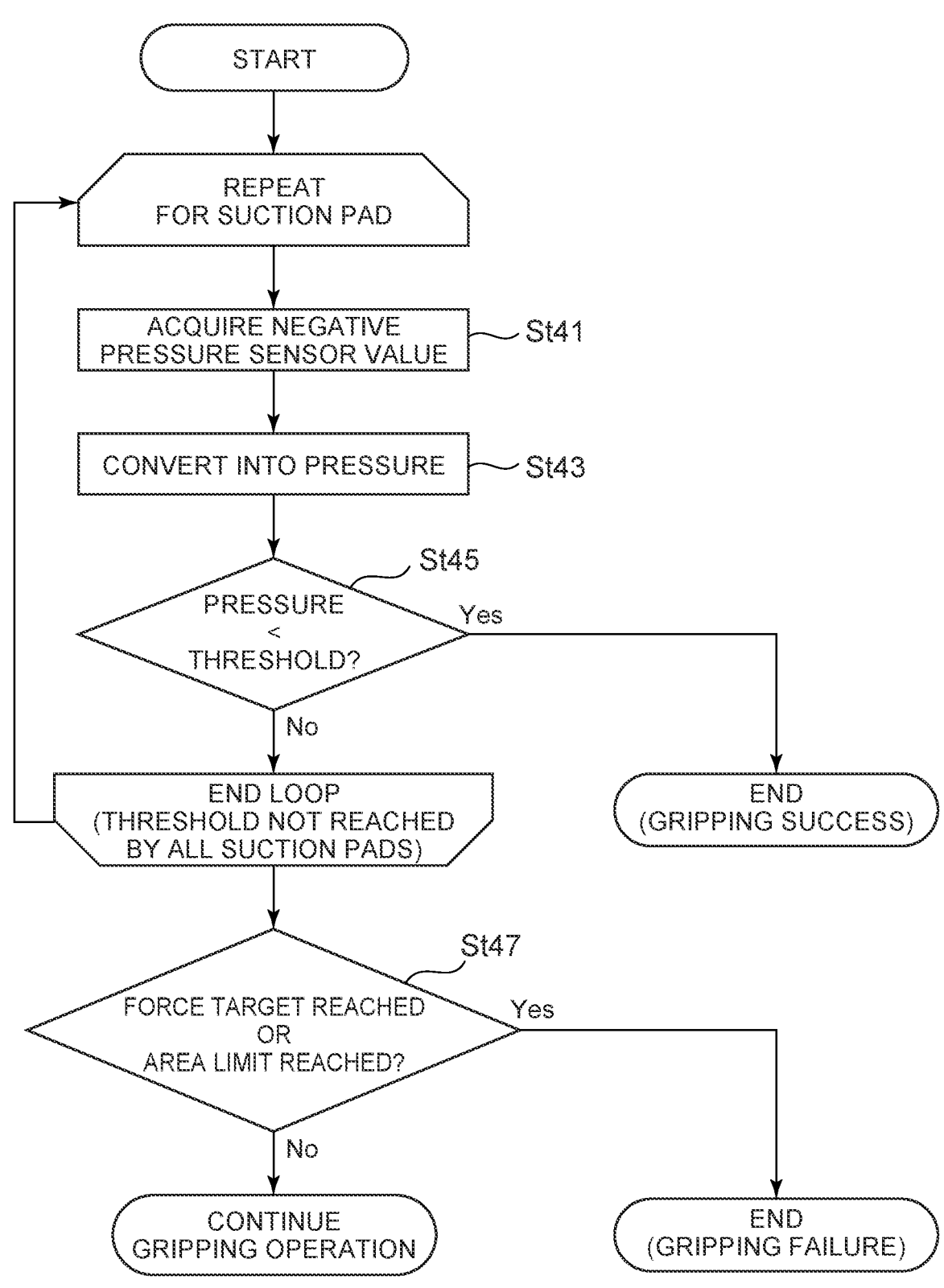
FIG. 10 is a flowchart showing a gripping end determination of the handling system according to the modification of the embodiment.

FIG. 10 is a flowchart showing a gripping end determination of the handling system according to the modification of the embodiment.

The hand controller 105 acquires the value of the negative pressure sensor for one of the suction pads 125 used in the gripping (step St41). The hand controller 105 converts the acquired value into a pressure (step St43). The hand controller 105 determines whether or not the pressure is less than a preset threshold (step St45). The threshold corresponds to a pressure included in the input grip data. When the pressure is less than the threshold, the hand controller 105 determines that the gripping of the object has succeeded, and ends the determination processing.

When the pressure is not less than the threshold, the hand controller 105 repeats the processing of steps St41, St43, and St45 for another suction pad 125 used in the gripping. When the pressure is not less than the threshold for all of the suction pads 125 to be used, the arm controller 205 determines whether or not the detected value of the force sensor 217 has reached the target force or the robot arm 200 has reached the area limit (step St47). The arm controller 205 transmits the determination result to the hand controller 105. When the determination is No in step St47, the hand controller 105 continues the gripping operation. In other words, the processing of the flowchart shown in FIG. 10 is re-performed. When the determination is Yes in step St47, the hand controller 105 determines that the gripping of the object has failed, and ends the determination processing.

In the handling system 1a, similarly to the handling system 1, the control in the gripping operation end is performed according to the flowchart shown in FIG. 6.

According to the handling system 1a according to the modification, similarly to the handling system 1, fast communication between the robot hand 100a and the robot arm 200 is possible while suppressing the degradation of the modularity of the robot arm 200.

EXAMPLE

Figure 11:
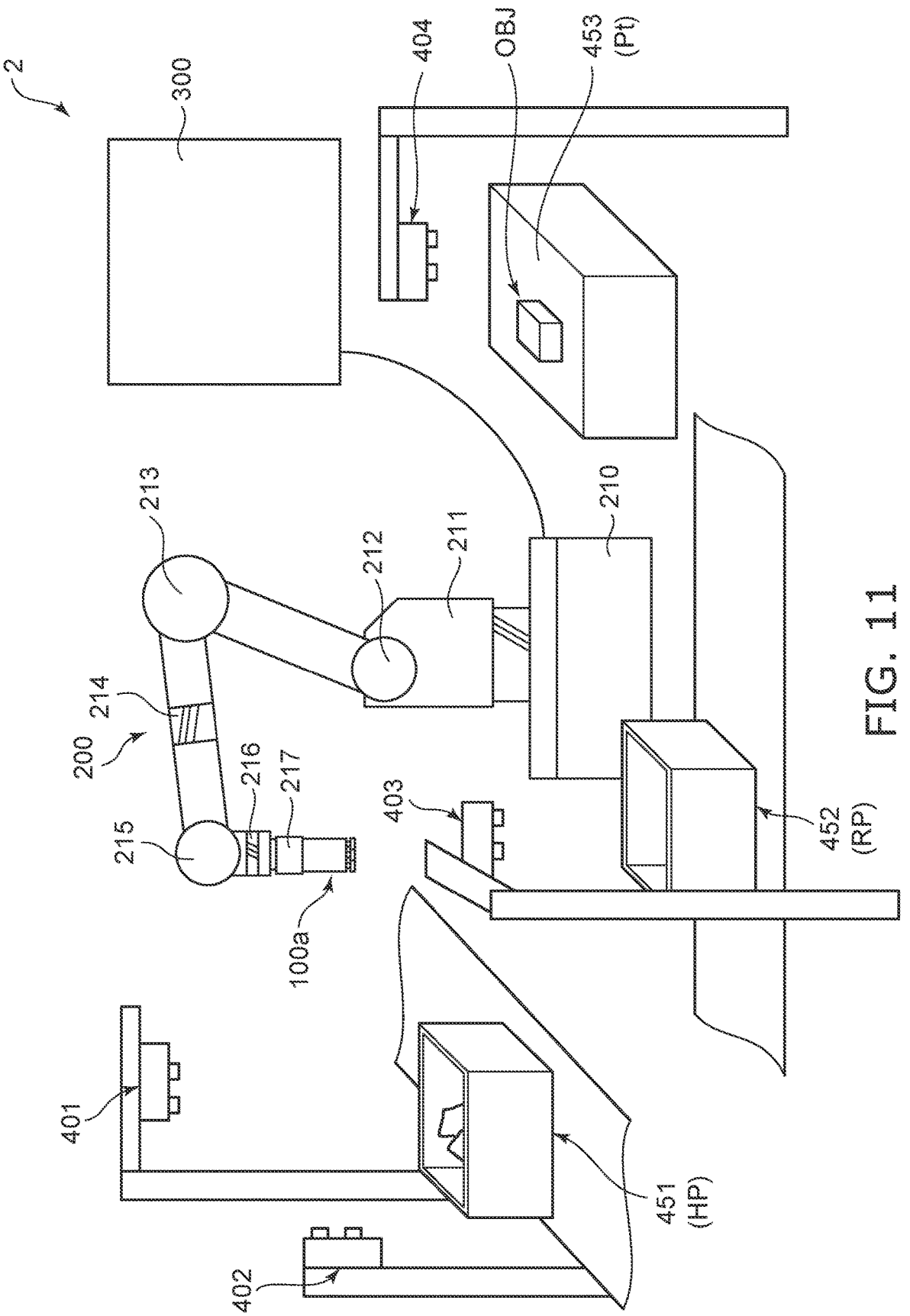
FIG. 11 is a schematic view showing a handling system according to an example.

FIG. 11 is a schematic view showing a handling system according to an example.

As shown in FIG. 11, the handling system 2 according to the example includes the robot hand 100a, the robot arm 200, the processing device 300, and cameras 401 to 404. The handling system 2 grips an object OBJ at a grip position HP, transfers the object OBJ, and releases the object OBJ at a release position RP. Such an operation also is called picking (transferring) the object OBJ. In the example, the robot hand 100a grips the object by suction.

The cameras 401 to 404 are, for example, RGB image cameras, range image cameras, laser rangefinders, laser imaging detection and ranging (LiDAR), etc., and can acquire image information and distance information (three-dimensional information). For example, the handling system 2 includes the camera 401 for gripping, the camera 402 for grip state confirmation or for calibration, the camera 403 for releasing, and the camera 404 for temporary placement.

The object OBJ to be gripped (dispatched) exists at the grip position HP. The gripping camera 401 images and detects the object OBJ and the peripheral region at the grip position HP. At the grip position HP, for example, the object OBJ is housed inside a container 451 such as a container, a pallet, etc. In such a case, the gripping camera 401 images and detects a part or the entirety of the interior of the container 451.

The calibration camera 402 images and detects the object OBJ at the calibration position. The calibration position is set to be higher than the grip position HP outside the container 451.

The releasing camera 403 images and detects the release position RP and the peripheral region at the release position RP at which the object OBJ is released (transferred). For example, the object OBJ at the release position RP is housed inside a container 452 such as a container, a pallet, etc. In such a case, the releasing camera 403 images and detects a part or the entirety of the interior of the container 452.

The temporary placement camera 404 images and detects a temporary placement position Pt and the peripheral region. The temporary placement position Pt is different from the grip position HP and the release position RP. For example, the object OBJ is temporarily placed on a temporary placement surface 453 such as a table or stage at the temporary placement position Pt. In such a case, the temporary placement camera 404 images and detects a part or the entirety of the temporary placement surface 453.

Figure 12:
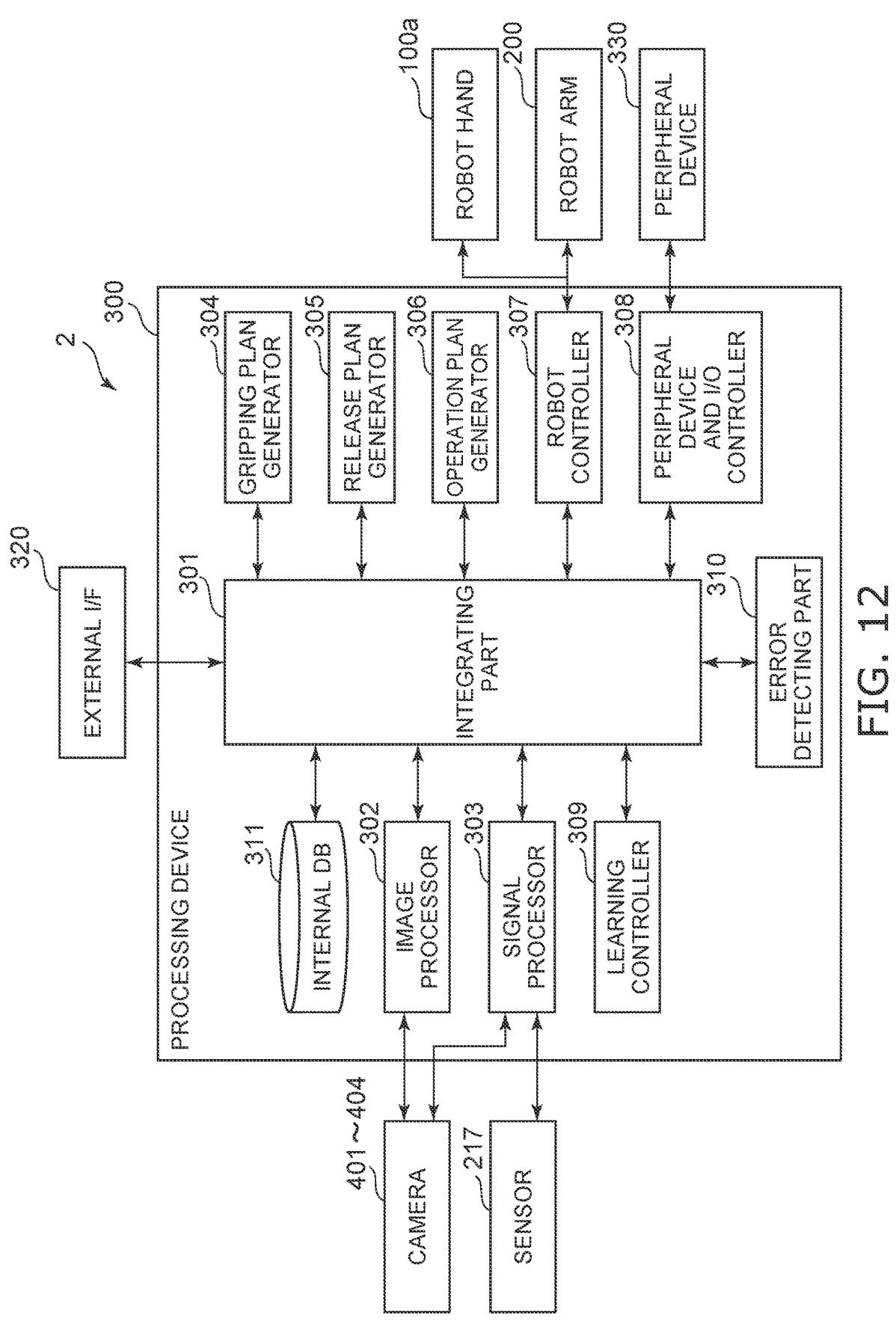
FIG. 12 is a schematic view showing functions of the processing device of the handling system according to the example.

FIG. 12 is a schematic view showing functions of the processing device of the handling system according to the example.

The processing device 300 includes, for example, an integrating part 301, an image processor 302, a signal processor 303, a gripping plan generator 304, a release plan generator 305, an operation plan generator 306, a robot controller 307, a peripheral device and I/O controller 308, a learning controller 309, an error detecting part 310, and an internal DB 311.

The integrating part 301 operates, manages, and performs the generation of the task plan of the handling system 2 based on the user input information from the external I/F 320, the state of the handling system 2, and the detected value of the force sensor 217.

The image processor 302 processes the images and information (detected values) obtained from the cameras 401 to 404 and generates information necessary for operation planning, operation control, error detection, learning, etc.

The signal processor 303 processes the information (the detected value) obtained from the force sensor 217 and generates information necessary for operation planning, operation control, error detection, etc.

The gripping plan generator 304 calculates position control data, force control data, grip data, etc. In other words, the gripping plan generator 304 calculates the gripping method of the object OBJ, the grip position HP, the grip orientation at the grip position HP, the movement path to the grip position HP, the grip width, and the grip force. The movement path is calculated so that the robot hand 100a and the robot arm 200 do not interfere with the surrounding environment.

The release plan generator 305 calculates the mounting method of the object OBJ, the release position RP, the gripping method, release method, and release orientation at the release position RP, and the movement path to the release position RP. The mounting method is a method for mounting the object OBJ at the location at which the gripped object OBJ is to be released. As an example, the mounting method includes pressing the object OBJ.

According to the instruction from the integrating part 301, the operation plan generator 306 calculates robot operation information, the operation method, the operation speed, the operation path, etc., so that the robot arm 200 moves to the grip position HP, the temporary placement position Pt, the release position RP, etc., via a movable path (via-points) from the current position.

The robot controller 307 controls the handling system 2 according to the information generated by the gripping plan generator 304, the release plan generator 305, or the operation plan generator 306, various operation switching instructions from the integrating part 301, etc. The robot controller 307 controls the robot hand 100a and the robot arm 200 according to various orientation information, trajectory planning information, position control data, force control data, grip data, etc., acquired from the integrating part 301.

The peripheral device and I/O controller 308 performs I/O control for various controls such as the control of various transfer devices, the control of peripheral devices 330 such as safety doors and the like, the acquisition of various sensor information, etc.

The learning controller 309 controls the learning function. The learning function includes robot model training to improve the operation accuracy such as vibration suppression of the robot arm 200 and the like, grip control parameter learning and grip database learning to improve the gripping performance of the object OBJ, error detection learning to improve the implementation performance of the task plan, etc.

The error detecting part 310 detects errors based on the state of the handling system 2, the implementation state of the task plan, the drive control state, the grip state of the object OBJ, the transfer state, etc. For example, the error detection can be realized by determining an error to have occurred when the value of the output of the force sensor 217 converted into hand coordinates or the value of the converted value passed through a low-pass filter is greater than a preset threshold. As a result, the task in progress can be interrupted, and the processing can transition to a recovery operation, etc.

The internal database (DB) 311 includes a robot database (robot DB), a hand database (hand DB), an object database (object DB), a grip database (grip DB), and an environment database (environment DB).

The robot DB stores the structure of the handling system 2, the dimension, weight, and moment of inertia of each of the components, and the operating range, speed, and torque performance of each driver.

The hand DB stores information related to the functions of the robot hand 100a and the characteristics of the gripping of the robot hand 100a.

The object DB stores the name, identification number, category, image information of the entire surface, CAD model information, weight information, and characteristic information when gripping the object OBJ. The characteristic information indicates the characteristics of the object OBJ to be gripped such as soft, fragile, deformable, etc.

The grip DB stores, for each gripping method of the robot hand 100a of the object OBJ, the grippable position, the grippable orientation, score information indicating the ease of gripping, the pressable amount when gripping, the determination threshold for the grip determination, and the determination threshold for the error detection. Gripping methods include, for example, suction, parallel two-finger, parallel four-finger, or articulated.

The environment DB stores information of the workbenches compatible with the handling system 2, surrounding environment information indicating the operating range of the handling system 2, obstacles at the periphery of the handling system 2, etc.

The external I/F 320 inputs and outputs the data between the integrating part 301 (the processing device 300) and external devices (not illustrated).

Figure 13:
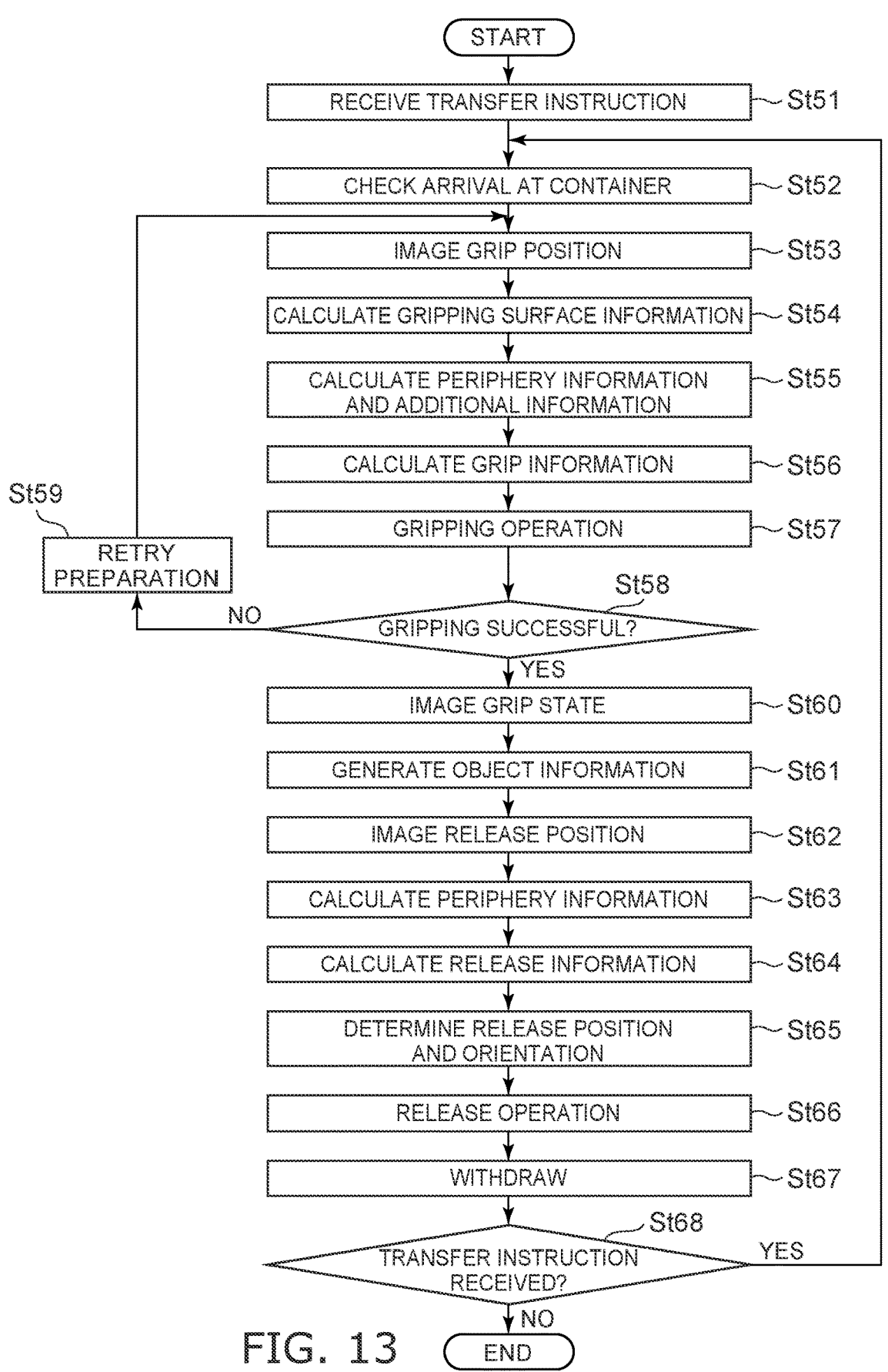
FIG. 13 is a flowchart showing processing according to the handling system according to the example.

FIG. 13 is a flowchart showing processing according to the handling system according to the example.

The integrating part 301 receives a transfer instruction (a handling instruction) of the object OBJ from an external device via the external I/F 321 (step St51).

The integrating part 301 detects that the object OBJ or the container 451 that houses the object OBJ has reached the grip position HP based on the image of the camera 401 and the detected values of other sensors such as photoelectric sensors and microswitches (step St52).

The integrating part 301 controls the camera 401 to image the grip position HP of the object OBJ and the periphery (step St53). For example, the camera 401 images the interior of the container 451 that houses the object OBJ.

Based on the image of the camera 401, the image processor 302 determines the existence or absence of the object OBJ and identifies grippable surfaces of the object OBJ. The image processor 302 also calculates gripping surface information such as the shape and size of the grippable surface of the object OBJ, the position and orientation in three-dimensional space, etc. (step St54).

The gripping plan generator 304 calculates periphery information and additional information (step St55). The periphery information is calculated based on the gripping surface information and is related to objects (peripheral parts) other than the object OBJ inside the container 451. The additional information is calculated based on the gripping surface information and the information of the object DB and indicates the movement direction of the robot arm 200, the magnitude of the pressing force, the movement tolerance range, etc., when performing the force control.

Based on the gripping surface information, the gripping plan generator 304 calculates multiple sets of grip information for the robot arm 200 to grip the grippable surface of the object OBJ (step St56). Based on the calculated multiple sets of grip information, the gripping plan generator 304 selects the object OBJ to be gripped, the grip position HP, the grip orientation, the target force, the grip width, and the grip force. Then, the operation plan generator 306 generates movement information from the current position of the robot arm 200 to reach the grip position HP and the grip orientation. In such a case, the grip information includes the periphery information and the additional information calculated in step St55 in addition to the grip position information and the grip orientation information.

When generating the grip information and the movement information in the processing of step St56, the integrating part 301 selects a high-speed operation in situations in which there is no or a low likelihood of interference between the robot arm 200 and objects other than the object OBJ. On the other hand, the integrating part 301 selects a low-speed operation in situations in which there is a high likelihood of interference between the robot hand 100a, the object OBJ, and other objects. High-likelihood situations include, for example, when the robot hand 100a approaches the container 451, when the robot hand 100a enters the container 451, etc. Also, in situations in which the likelihood of interference is high, the operation plan generator 306 determines the target value of the force generated at the robot hand 100a.

The robot controller 307 outputs the position control data and the force control data to the robot arm 200. The position control data includes the grip position HP, the grip orientation, and the movement path to the grip position HP. The force control data includes the target force and the area limit. The robot controller 307 outputs a gripping operation instruction based on the grip information to the robot hand 100a. The gripping operation instruction includes the grip width and the grip force. The robot arm 200 and the robot hand 100a operate according to the output instructions. As an example, in the peripheral region of the grip position HP of the object OBJ, the pressing operation of the robot hand 100a is performed by the force control only; and the gripping operation by suction-gripping or the like is performed while the suction pad 125 sufficiently contacts the object OBJ (step St57).

When interference of the robot hand 100a occurs in the peripheral region of the grip position HP, an operation to avoid the obstacle interfering with the robot hand 100a is performed according to the given operation technique and target force value. When the gripping surface of the object OBJ has a relatively large tilt, the robot hand 100a performs an operation to follow the gripping surface of the object OBJ.

The integrating part 301 or the robot controller 307 acquires the result of the gripping operation from the robot hand 100a and determines whether or not the gripping of the object OBJ has succeeded (step St58).

When the gripping has failed, the integrating part 301 performs a retry preparation operation such as performing a withdraw operation of the robot arm 200, registering information of the failure of the gripping in the object DB, etc. (step St59). Then, step St53 is re-performed to perform the retry operation of the gripping.

When the gripping has succeeded, the robot controller 307 controls the robot arm 200 to move to a position at which the grip state of the object OBJ by the robot hand 100a can be imaged. The integrating part 301 controls the camera 402 to image the robot hand 100a gripping the object OBJ at that position (step St60).

The image processor 302 generates object information from the image taken by the camera 402 (step St61). The object information indicates the relative position of the object OBJ with respect to the robot hand 100a, the relative orientation of the object OBJ with respect to the robot hand 100a, and the state and shape of the object OBJ.

The integrating part 301 controls the camera 403 to image the release position RP of the object OBJ and the periphery of the release position RP (step St62). For example, the camera 403 images the interior of the container 452 that houses the gripped object OBJ.

The image processor 302 collaborates with the integrating part 301 to calculate the periphery information from the image taken by the camera 403 (step St63). The periphery information includes the determination result of the existence or absence of other objects other than the object OBJ at the release position RP and the periphery, the sizes and positions of the other objects, the positions of the surfaces of the other objects, etc.

The release plan generator 305 calculates release information of the object OBJ gripped by the robot arm 200 based on the object information, the information of the grip DB, the periphery information, etc. (step St64). The release information indicates the release position, the release orientation, the via-point positions, the via-point orientations, etc. At this time, the release plan generator 305 calculates additional information such as the pressing direction and the magnitude of the pressing force of the robot hand 100a when performing the force control, the movement tolerance range of the force control, etc. The release plan generator 305 adds the additional information to the release information.

The release plan generator 305 determines the release position RP and release orientation of the gripped object OBJ based on the release information (step St65).

The robot controller 307 outputs the release information to the robot hand 100a and the robot arm 200. The robot hand 100a and the robot arm 200 operate according to the release information. Thereby, the object OBJ is moved to the release position RP and is released at the release position RP (step St66). When the wall of the container 452 or an object of sufficient size exists in the peripheral region of the release position RP of the object OBJ, the robot hand 100a performs an operation of pressing the object OBJ against the wall or the surface of the object. Thereby, the objects OBJ can be arranged more densely in the container 452. Even when the surface has a relatively large tilt, the pressing method and the pressing force can cause the object OBJ to be released in a state in which the object OBJ closely follows the surface.

After releasing the object OBJ to be placed, the robot controller 307 controls the robot hand 100a to withdraw from the container 452 and controls the robot arm 200 to assume a standby orientation (step St67).

The integrating part 301 determines whether or not the next transfer instruction has been received from the external device via the external I/F 320 (step St68).

Step St52 is re-performed when the integrating part 301 has received the next transfer instruction in the determination of step St68. The series of controls for the next object OBJ is started thereby. When the integrating part 301 has not received the next transfer instruction in the determination of step St68, the series of controls ends.

According to the handling system 2, the processing device 300 calculates at least one selected from the plan related to the transfer, the grip information, and the movement information. The plan related to the transfer is at least one selected from the gripping plan, the release plan, a motion plan, and the task plan. The motion plan may include the operation plan. According to the handling system 2, objects can be handled more efficiently. On the other hand, the computational load on the processing device 300 increases. However, in the gripping operation, the signals related to the gripping operation are communicated between the robot hand 100a and the robot arm 200. Therefore, even when the computational load on the processing device 300 is increased, a delay of the gripping operation can be suppressed. According to the example, more efficient handling of the object can be realized.

In the example described above, the robot hand 100 or 100a is mounted to the robot arm 200; and the second communicator 102 communicates with the robot arm 200. Applications of the robot hands 100 and 100a according to the embodiment are not limited to the examples. The robot hand 100 or 100a may be included in a mobile body such as an automated guided vehicle (AGV), a drone, etc.

Figure 14:
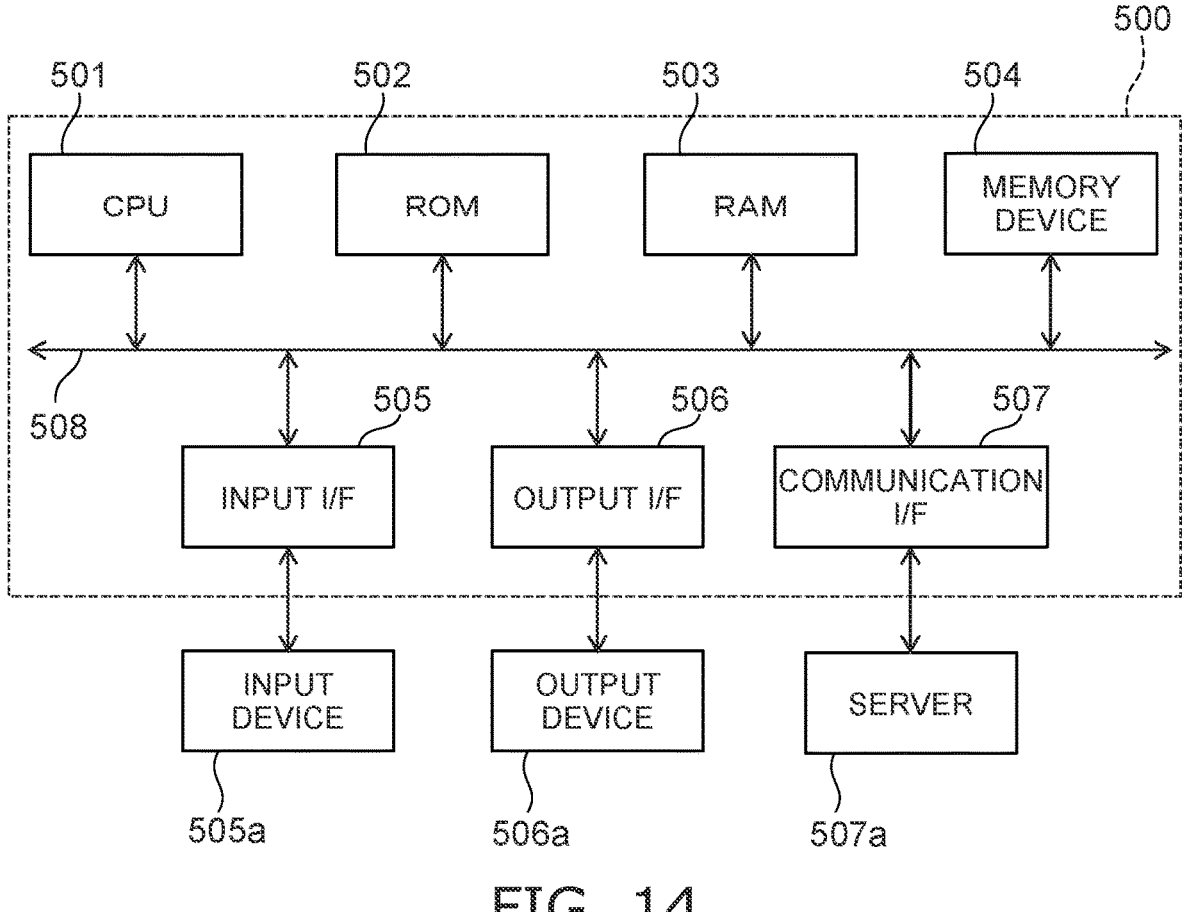
FIG. 14 is a schematic view showing a hardware configuration.

FIG. 14 is a schematic view showing a hardware configuration.

For example, the processing device 300 is realized by a computer 500 illustrated in FIG. 14. The computer 500 illustrated in FIG. 14 includes a CPU 501, ROM 502, RAM 503, a memory device 504, an input interface 505, an output interface 506, and a communication interface 507.

The ROM 502 stores programs controlling the operation of the computer 500. The ROM 502 stores programs necessary for causing the computer 500 to realize the processing described above. The RAM 503 functions as a memory region where the programs stored in the ROM 502 are loaded.

The CPU 501 includes a processing circuit. The CPU 501 uses the RAM 503 as work memory and executes programs stored in at least one of the ROM 502 or the memory device 504. When executing the programs, the CPU 501 controls configurations via a system bus 508 and executes various processing.

The memory device 504 stores data necessary for executing the programs and/or data obtained by executing the programs.

The input interface (I/F) 505 connects the computer 500 and an input device 505a. The input I/F 505 is, for example, a serial bus interface such as USB, etc. The CPU 501 can read various data from the input device 505a via the input I/F 505.

The output interface (I/F) 506 connects the computer 500 and an output device 506a. The output I/F 506 is, for example, an image output interface such as Digital Visual Interface (DVI), High-Definition Multimedia Interface (HDMI (registered trademark)), etc. The CPU 501 can output data to the output device 506a via the output I/F 506 and cause the output device 506a to output the data.

The communication interface (I/F) 507 connects the computer 500 and a server 507a outside the computer 500. The communication I/F 507 is, for example, a network card such as a LAN card, etc. The CPU 501 can read various data from the server 507a via the communication I/F 507.

The memory device 504 includes at least one selected from a hard disk drive (HDD) and a solid state drive (SSD). The input device 505a includes at least one selected from a mouse, a keyboard, a microphone (audio input), and a touchpad. The output device 506a includes at least one selected from a monitor, a projector, a printer, and a speaker. A device such as a touch panel that functions as both the input device 505a and the output device 506a may be used.

According to the handling system, the instruction device, the handling method, or the instruction method described above, the processing necessary for the handling of articles can be more automated, and human tasks can be reduced. Similar effects also can be obtained by using a program for causing the computer to operate as the instruction device.

The processing of the various data described above may be recorded, as a program that can be executed by a computer, in a magnetic disk (a flexible disk, a hard disk, etc.), an optical disk (CD-ROM, CD-R, CD-RW, DVD-ROM, DVD±R, DVD±RW, etc.), semiconductor memory, or another non-transitory computer-readable storage medium.

For example, the information that is recorded in the recording medium can be read by a computer (or an embedded system). The recording format (the storage format) of the recording medium is arbitrary. For example, the computer reads the program from the recording medium and causes the CPU to execute the instructions recited in the program based on the program. In the computer, the acquisition (or the reading) of the program may be performed via a network.

While certain embodiments have been described, these embodiments have been presented by way of example only, and are not intended to limit the scope of the inventions.

Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention. The above embodiments can be practiced in combination with each other.

What is claimed is:

1. A handling system, comprising:
a robot hand configured to grip an object;
a robot arm; and
a processing device,
wherein the robot hand includes
    a first communicator including a communication interface and configured to communicate grip data with the processing device, the grip data being related to a gripping operation,
    a second communicator including a communication interface and configured to communicate a start notification and an end notification with the robot arm, the start notification being for starting the gripping operation, the end notification indicating an end of the gripping operation, and
    a hand controller configured to control the gripping operation,
wherein the first communicator, the second communicator, and the hand controller are integrated in the robot hand,
an amount of communicable data per unit time between the second communicator and the robot arm is less than an amount of communicable data per unit time between the first communicator and the processing device,
in response to the start notification input to the second communicator, the hand controller is further configured to start the gripping operation based on the grip data input to the first communicator, and
in response to the end of the gripping operation, the hand controller is further configured to
    output the end notification from the second communicator to the robot arm, and
    output from the first communicator to the processing device at least one of a result of the gripping operation or a state of the robot hand.

2. The handling system according to claim 1, further comprising:
a pinching mechanism configured to pinch the object,
the grip data including a grip width and a grip force when the object is gripped by the pinching mechanism.

3. The handling system according to claim 2, wherein when the grip width and the grip force are realized by the pinching mechanism, the hand controller
    determines that the gripping operation has ended, and
    performs the output of the end notification and the output of the at least one of the result of the gripping operation or the state of the robot hand.

4. The handling system according to claim 1, further comprising:
a suction mechanism configured to suction-grip the object,
the grip data including a pressure when the object is gripped by the suction mechanism.

5. The handling system according to claim 4, wherein when the pressure is realized by the suction mechanism, the hand controller
    determines that the gripping operation has ended, and
    performs the output of the end notification and the output of the at least one of the result of the gripping operation or the state of the robot hand.

6. The handling system according to claim 1, wherein the first communicator is configured to communicate with the processing device via at least one selected from serial communication, Serial Peripheral Interface, Inter-Integrated Circuit, Universal Serial Bus, Ethernet, and Bluetooth, and
the second communicator is configured to communicate with the robot arm via at least one selected from (i) digital input/output signaling configured for direct transmission of binary high/low state signals without packet-based serial protocols, and (ii) parallel communication in which multiple bits are transmitted simultaneously across multiple signal lines, including bus connections selected from Advanced Technology Attachment (ATA) and Peripheral Component Interconnect (PCI).

7. The handling system according to claim 1, wherein the robot arm includes:
a third communicator including a communication interface and configured to communicate a control instruction with the processing device, the control instruction including position control data;
a fourth communicator including a communication interface and configured to communicate the start notification and the end notification with the second communicator; and
an arm controller configured to perform a position control based on the position control data.

8. The handling system according to claim 7, wherein the control instruction further includes force control data, and
the arm controller is configured to perform a force control based on the force control data after the position control.

9. The handling system according to claim 8, further comprising a force sensor provided between the robot hand and the robot arm and configured to detect a force acting on the robot hand,
wherein when a detected value of the force sensor reaches a target force included in the force control data, the arm controller outputs the start notification from the fourth communicator to the second communicator.

10. The handling system according to claim 7, wherein a stop signal is communicated between the second communicator and the fourth communicator to instruct an operation stop of the robot hand or the robot arm.

11. The handling system according to claim 7, wherein the third communicator is configured to communicate with the processing device via at least one selected from serial communication, Serial Peripheral Interface, Inter-Integrated Circuit, Universal Serial Bus, Ethernet, and Bluetooth, and
the second communicator and the fourth communicator are configured to communicate with each other via at least one selected from digital input/output and parallel communication.

12. The handling system according to claim 6, wherein the robot arm moves in response to a reception of the end notification.

13. The handling system according to claim 7, wherein the third communicator, the fourth communicator, and the arm controller are integrated in the robot arm.

14. The handling system according to claim 1, further comprising:
a pinching mechanism configured to pinch the object,
the grip data including a grip width and a grip force when the object is gripped by the pinching mechanism,

when the grip width and the grip force are realized by the pinching mechanism, the hand controller
determines that the gripping operation has ended, and performs the output of the end notification and the output of the at least one of the result of the gripping operation or the state of the robot hand.

15. The handling system according to claim 1, further comprising:
a suction mechanism configured to suction-grip the object,
the grip data including a pressure when the object is gripped by the suction mechanism,
when the pressure is realized by the suction mechanism, the hand controller
determines that the gripping operation has ended, and performs the output of the end notification and the output of the at least one of the result of the gripping operation or the state of the robot hand.

16. The handling system according to claim 14, further comprising a force sensor provided between the robot hand and the robot arm and configured to detect a force acting on the robot hand,
wherein when a detected value of the force sensor reaches a target force included in the force control data, the arm controller outputs the start notification from the fourth communicator to the second communicator, and
a stop signal is communicated between the second communicator and the fourth communicator to instruct an operation stop of the robot hand or the robot arm.

17. A method for controlling a robot hand that grips an object, the method comprising:
inputting grip data from a processing device to the robot hand via a first communicator, the grip data being related to a gripping operation;
inputting a start notification from a robot arm to the robot hand via a second communicator, the start notification being for starting the gripping operation, an amount of communicable data per unit time between the second communicator and the robot arm being less than an amount of communicable data per unit time between the first communicator and the processing device;
starting the gripping operation based on the grip data in response to the start notification; and
in response to an end of the gripping operation, outputting an end notification to the robot arm via the second communicator, the end notification indicating the end of the gripping operation, and
at least one of a result of the gripping operation or a state of the robot hand to the processing device via the first communicator,
wherein the first communicator, the second communicator, and the hand controller are integrated in the robot hand.

18. The method according to claim 17, wherein the grip data includes a grip width and a grip force when the object is gripped by a pinching mechanism, and
when the grip width and the grip force are realized by the pinching mechanism, the gripping operation is determined to have ended, the output of the end notification is performed, and the output of the at least one of the result of the gripping operation or the state of the robot hand is performed.

19. The method according to claim 17, wherein the grip data includes a pressure when the object is gripped by a suction mechanism, and
when the pressure is realized by the suction mechanism, the gripping operation is determined to have ended, the output of the end notification is performed, and the output of the at least one of the result of the gripping operation or the state of the robot hand is performed.

20. A non-transitory computer-readable storage medium storing a program, the program causing a control device to perform the method according to claim 17.

21. The handling system according to claim 7, wherein an amount of communicable data per unit time between the second communicator and the fourth communicator is less than an amount of communicable data per unit time between the third communicator and the processing device.

\* \* \* \* \*